United States Patent
Yanaka et al.

(10) Patent No.: US 7,388,674 B2
(45) Date of Patent: Jun. 17, 2008

(54) LASER TRACKING INTERFEROMETER

(75) Inventors: Shinichirou Yanaka, Tsukuba (JP); Makoto Abe, Tsukuba (JP); Shinichi Hara, Tsukuba (JP); Naoyuki Taketomi, Tsukuba (JP)

(73) Assignee: Mitutoyo Corporation, Kawasaki-shi (JP)

( * ) Notice: Subject to any disclaimer, the term of this patent is extended or adjusted under 35 U.S.C. 154(b) by 180 days.

(21) Appl. No.: 11/458,533

(22) Filed: Jul. 19, 2006

(65) Prior Publication Data

US 2007/0024861 A1 Feb. 1, 2007

(30) Foreign Application Priority Data

Jul. 26, 2005 (JP) .............................. 2005-216110

(51) Int. Cl.
*G01B 9/06* (2006.01)

(52) U.S. Cl. ..................................................... 356/498

(58) Field of Classification Search ................ 356/498, 356/493, 486, 482
See application file for complete search history.

(56) References Cited

U.S. PATENT DOCUMENTS 6,147,748 A 11/2000 Hughes

2002/0036764 A1 3/2002 Osawa et al.

FOREIGN PATENT DOCUMENTS

| JP | 2603429 | 1/1997 |
| JP | 2002-98510 | 4/2002 |

*Primary Examiner*—Hwa (Andrew) S Lee
(74) *Attorney, Agent, or Firm*—Rankin, Hill & Clark LLP (57) ABSTRACT

A laser tracking interferometer directs a laser beam to a retroreflector serving as an object to be measured to sense a displacement of the retroreflector using interference with a laser beam back reflected from the retroreflector. The laser tracking interferometer includes: a reference sphere; a carriage that rotates about a center of the reference sphere; a laser interferometer; a displacement gage for providing a displacement signal corresponding to a relative displacement between the reference sphere and the displacement gage; a data processing apparatus for computing a displacement of the retroreflector; a position sensitive detector for providing a position signal corresponding to deviation of a laser beam; and a controller for controlling rotation of the carriage based on the position signal so that the amount of deviation becomes zero.

9 Claims, 7 Drawing Sheets

Fig. 1

PRIOR ART

Fig. 2

PRIOR ART

Fig3

PRIOR ART

LASER TRACKING INTERFEROMETER

CROSS-REFERENCE TO RELATED APPLICATION

The disclosure of Japanese Patent Application No. 2005-216110 filed on Jul. 26, 2005 including specifications, drawings and claims is incorporated herein by reference in its entirety.

BACKGROUND OF THE INVENTION

1. Field of the Invention

The present invention relates to a laser tracking interferometer for measuring the displacement and position of a moving object with high accuracy while tracking the moving object. More particularly, the present invention relates to an improvement of a laser tracking interferometer which directs a laser beam to a retroreflector to sense a displacement of the retroreflector using the interference with a laser beam back reflected from the retroreflector as well as to track the retroreflector using a change in position of the optical axis of the laser beam.

2. Description of the Related Art

Such a laser tracking interferometer is known which directs a laser beam to a retroreflector to sense a displacement of the retroreflector using the interference with a laser beam back reflected from the retroreflector as well as to track the retroreflector using a change in position of the optical axis of the laser beam.

Figure 1:
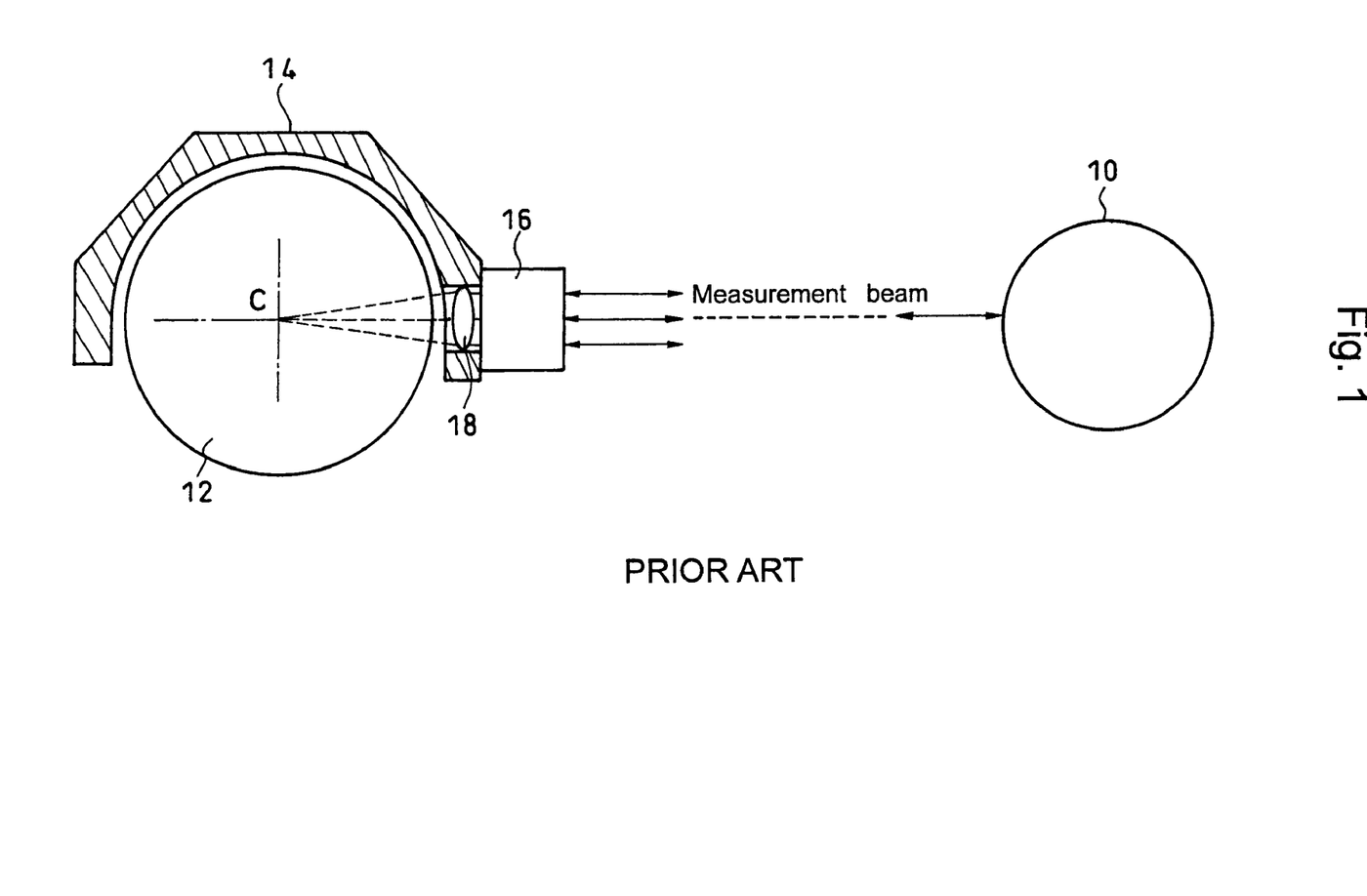
FIG. 1 is a cross-sectional view illustrating the main configuration of a laser tracking interferometer described in Patent Document 1.
Figure 2:
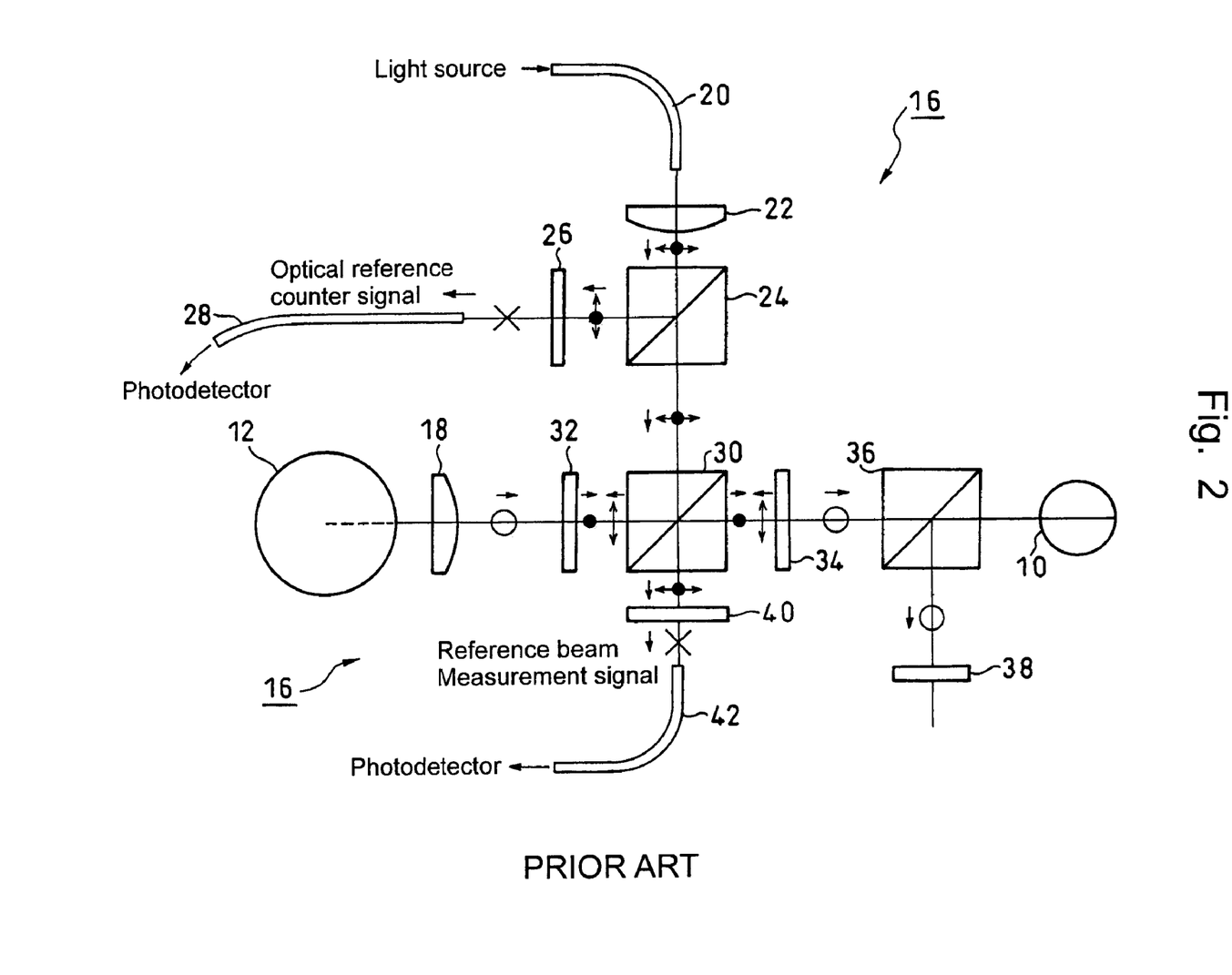
FIG. 2 is a view illustrating the detailed configuration of an optical path in an interferometer portion of the laser tracking interferometer of Patent Document 1.

For example, as shown in FIG. 1 (overall configuration) and FIG. 2 (the detailed configuration of a laser interferometer), disclosed in the description of US Pat. No. 6,147,748 (hereinafter referred to as Patent Document 1) is a laser tracking interferometer which is designed to measure a relative displacement between a retroreflector 10 and the center C of a reference sphere 12.

This laser interferometer includes the reference sphere 12; a carriage 14 designed to rotate about the center C of the reference sphere 12; a laser interferometer 16 including a light source (not shown); and a condenser lens 18 for focusing a measurement beam at the center C or on the surface of the reference sphere 12. The laser interferometer 16 and the condenser lens 18 are provided on the carriage 14.

In this arrangement, as shown in FIG. 2, a light beam emitted from a light source enters a non-polarizing beam splitter (NPBS) 24 through an optical fiber 20 and a collimator lens 22, and a portion of the light beam is reflected off the NPBS 24 to be directed as an optical reference counter signal to a photodetector (not shown) through a polarizing plate 26 and an optical fiber 28. The optical reference counter signal is used to compensate polarization mixing in the optical fiber. On the other hand, the light beam that has passed through the NPBS 24 is separated at a polarizing beam splitter (PBS) 30 into two. One goes straight through as a reference and interfered with a measurement beam for obtaining measurement signal. The other is reflected off the PBS 30 and then transmitted as the measurement beam to the center C or the surface of the reference sphere 12 through a quarter-wave ($\lambda/4$) plate 32 and the condenser lens 18.

The measurement beam that has been reflected off the surface of the reference sphere 12 is directed to the retroreflector 10 through the condenser lens 18, the $\lambda/4$ plate 32, the PBS 30, a $\lambda/4$ plate 34, and a NPBS 36.

The measurement beam that has been reflected off the retroreflector 10 reenters the laser interferometer 16. A portion of the measurement beam that is incident upon the laser interferometer 16 is reflected off the NPBS 36 to enter a position sensitive detector (PSD) 38. On the other hand, the remaining portion passes through the $\lambda/4$ plate 34, the PBS 30, a polarizing plate 40, and an optical fiber 42 to interfere with the reference beam and then enter the photodetector.

Since the output from the photodetector varies according to the interference pattern of the incident interference beam, the output from the photodetector can be used to measure the displacement of the retroreflector 10 with respect to the center C of the reference sphere 12.

The reference sphere 12 having a high sphericity allows the distances from the center C of the reference sphere 12 to the surface to be constant with high accuracy. This makes it possible to measure the displacement of the retroreflector 10 with high accuracy with respect to the center C of the reference sphere 12 even when the laser interferometer 16 tracks the retroreflector 10 to rotate about the center C of the reference sphere 12.

On the other hand, the retroreflector 10 is tracked as follows. That is, a portion of the measurement beam incident upon the laser interferometer 16 enters the PSD 38. Thus, the position of the carriage 14 can be controlled to allow the position of the measurement beam on the PSD 38 to be kept constant all the time, thereby automatically tracking the retroreflector 10. This is because the positional displacement of the measurement beam incident upon the PSD 38 varies depending on the displacement of the retroreflector 10 in a direction perpendicular to the optical axis of the measurement beam, so that a displacement of the retroreflector 10 in a direction perpendicular to the optical axis of the measurement beam causes the optical axis of the measurement beam back reflected from the retroreflector 10 to be displaced in parallel.

Figure 3:
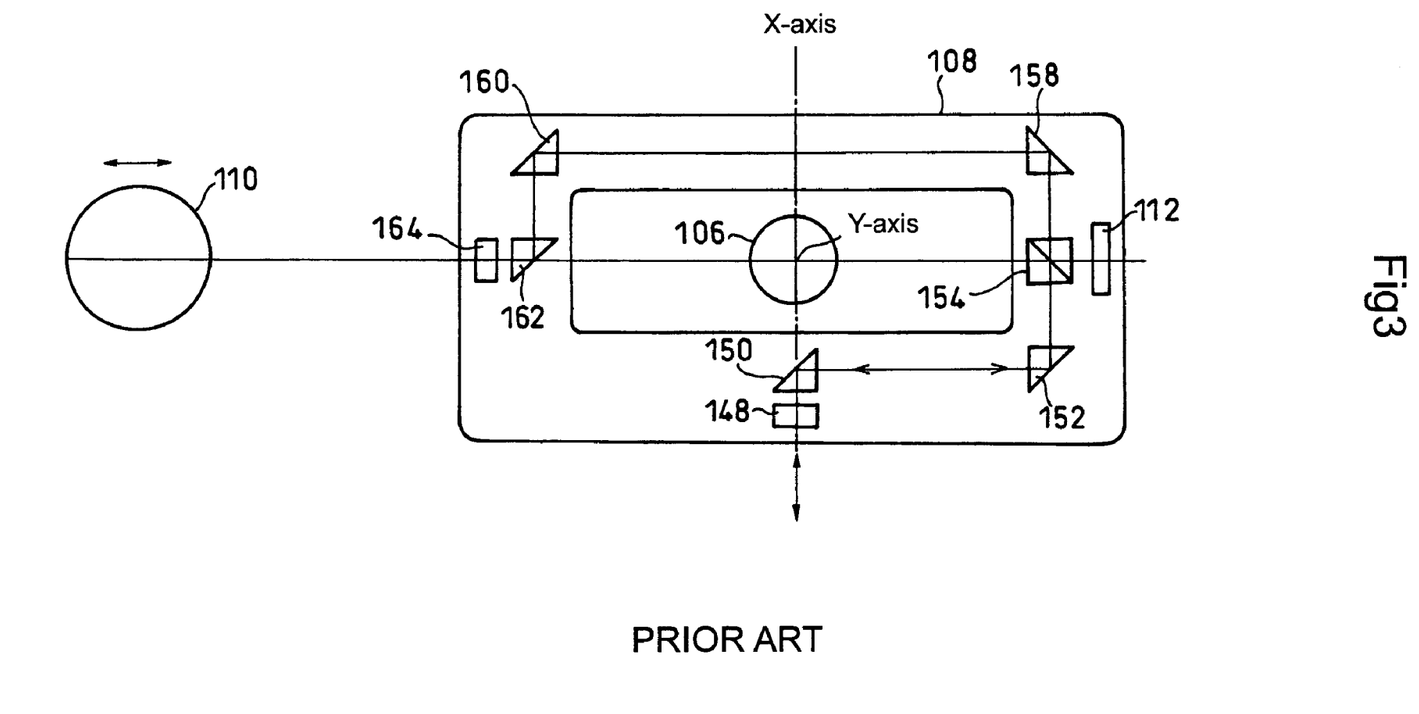
FIG. 3 is a view illustrating the main configuration of an optical path of a laser tracking interferometer described in Patent Document 2.

On the other hand, as shown in FIG. 3, a laser tracking interferometer for measuring the relative displacement between a retroreflector 106 serving as a reference and a retroreflector 110 serving as a target is disclosed in the Publication of Japanese Patent No. 2603429 (hereinafter referred to as Patent Document 2).

This laser interferometer includes: a first retroreflector 106 disposed at a fixed location; a second retroreflector 110 disposed on a moving object; a rotating portion 108 which is rotatable about each of the X-axis and the Y-axis which orthogonally intersect each other at the center of the first retroreflector 106; means for directing a laser beam produced by lasing in a laser light source (not shown) to the rotating portion 108 irrespective of the rotation of the rotating portion 108; and an optical system made up of a plurality of optical components ($\lambda/4$ plates 148 and 164, prisms 150, 152, 158, 160, and 162, and a PBS 154) which are each disposed at a fixed location in the rotating portion 108.

This optical system is designed such that a laser beam directed to the rotating portion 108 is divided at the PBS 154 into two, one of which goes through an optical path orthogonal to the X-axis and enters the first retroreflector 106 while the other laser beam further travels along the optical path and enters the second retroreflector 110, thereby allowing for providing the reflected beams from each of the first and second retroreflectors 106 and 110.

Also included are a detecting portion (not shown) for detecting the amount of movement of the second retroreflector 110 based on the interference between the two reflected beams obtained via the optical system; a quadrant photodiode (QPD) 112 serving as position sensitive detector, which is disposed at a fixed location in the rotating portion 108 and upon which a portion of the reflected beam from the second retroreflector 110 is incident, for providing a position signal corresponding to the amount of deviation of the laser beam incident upon the second retroreflector 110; and control means (not shown) for controlling the rotational position of the rotating portion 108 about the X-axis and the Y-axis so that the amount of deviation becomes zero, based on the position signal from the position sensitive detector.

On the other hand, a laser tracking length-measuring interferometer which is provided with a tracking mirror in an optical path of an interference optical system instead of the reference sphere is disclosed in Japanese Patent Laid-Open Publication No. 2002-98510 (hereinafter referred to as Patent Document 3). With this interferometer, a laser beam is directed to the center of the reflection plane of the tracking mirror, and the tracking mirror can be controlled for the reflected beam to be directed in a desired direction, thereby allowing the reflected beam to impinge upon a retroreflector serving as an object to be measured for tracking purposes.

However, the technique described in Patent Document 1 has the following problems: (1) when the measurement beam is condensed so as to focus at the center C of the reference sphere 12, this arrangement is susceptible to runout of the rotational mechanism (a deviation between the actual locus, which a point on the rotational mechanism draws when the rotational mechanism rotates, and the ideal locus). That is, a deviation of the center of the focus of the measurement beam from the position C due to the runout of the rotational mechanism causes the S/N of a signal produced by a photodetector to degrade, thereby disabling the measurement of displacement. This arrangement is thus susceptible to the runout of the rotational mechanism. On the other hand, there is also another problem with this technique: (2) with a focus on the surface of the reference sphere 12, this arrangement is susceptible to flaws and dust particles on the surface of the reference sphere, and particularly more susceptible to small flaws and dust particles when the focus has a smaller diameter.

According to the technique described in Patent Document 2, when a metal sphere or a glass sphere coated with metal is employed as a reference sphere, the technique also has the following problems as with the technique disclosed in Patent Document 1. That is, (1) with the center of the reference sphere employed as the focus, the arrangement is not robust to the runout of the rotational mechanism; and (2) with the surface of the reference sphere employed as the focus, the arrangement is susceptible to flaws and dust particles on the surface of the reference sphere.

Furthermore, when a sphere formed of a material having a refractive index of 2.0 is employed as a reference sphere, the arrangement has a problem, in addition to the aforementioned problem (2), that such a sphere is not commercially available in general, and thus the reference sphere is expensive and difficult to obtain.

On the other hand, with the technique disclosed in Patent Document 3, when the center of a laser beam is not aligned with the center of rotation of a mirror, this error may cause an error in the measurement of length. However, the center position of the laser beam is difficult to measure with high accuracy, and thus difficult to be aligned with the center of rotation of the mirror with high accuracy. Furthermore, a steel sphere and a semisphere are seated under pressure by means of tensile force exerted by a helical spring, thereby causing an increase in friction between the steel sphere in a three-point spherical seat and the semispherical portion of the mirror. It is thus difficult to provide control with accuracy. Additionally, although a high-precision sphere can be made relatively easily, a high-precision semisphere is expensive. Thus, there is a problem that the semispherical mirror is made only at high costs.

SUMMARY OF THE INVENTION

In view of the foregoing problems, various exemplary embodiments of this invention provide a laser tracking interferometer which is robust to runout of the rotational mechanism, less susceptible to flaws and dust particles on the surface of the reference sphere, and capable of employing a relatively inexpensive reference sphere.

To solve the aforementioned problems, the present invention provides a laser tracking interferometer which directs a laser beam to a retroreflector serving as an object to be measured to sense a displacement of the retroreflector using interference with a laser beam back reflected from the retroreflector as well as to track the retroreflector using a change in position of the optical axis of the laser beam. The laser tracking interferometer comprises: a reference sphere disposed at a fixed location; a carriage configured to rotate about a center of the reference sphere; a laser interferometer for providing a displacement signal corresponding to a displacement of the retroreflector, and a displacement gage for providing a displacement signal corresponding to a relative displacement between the reference sphere and the displacement gage, the laser interferometer and the displacement gage being disposed on the carriage; a data processing apparatus for computing a displacement of the retroreflector with respect to the reference sphere in accordance with the displacement signal provided by the displacement gage and the displacement signal provided by the laser interferometer; position sensitive detector for providing a position signal corresponding to the amount of deviation of a laser beam when the laser beam is reflected off the retroreflector back into the laser interferometer and deviated in a direction orthogonal to its optical axis; and control means for controlling rotation of the carriage based on the position signal from the position sensitive detector so that the amount of deviation becomes zero.

The laser interferometer may be a Michelson interferometer.

The displacement gage may be provided on both sides of the reference sphere so that the laser tracking interferometer is not susceptible to fluctuations in temperature.

The displacement gage may be a capacitive displacement gage or an eddy-current displacement gage.

The reference sphere may be a metal sphere.

The position sensitive detector may be a quadrant photodiode (QPD) or a two-dimensional position sensitive detector (PSD)

According to the laser tracking interferometer of the present invention, a displacement gage is disposed on a carriage for providing a displacement signal corresponding to a relative displacement between a reference sphere and the displacement gage, so that the displacement gage and the laser interferometer are concurrently used for measurement of distances. In principle, this makes the laser tracking interferometer not susceptible to runout of the rotational mechanism, and thus very robust to the runout of the rotational mechanism. The laser tracking interferometer is also robust to flaws and dust particles on the surface of the reference sphere because the surface of the reference sphere is irradiated with no laser beam. It is also possible to employ a relatively inexpensive reference sphere.

These and other novel features and advantages of the present invention will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals, and wherein.

DETAILED DESCRIPTION OF THE PREFERRED EMBODIMENTS

Now, exemplary embodiments of the present invention will be described below in more detail with reference to the accompanying drawings.

Figure 4:
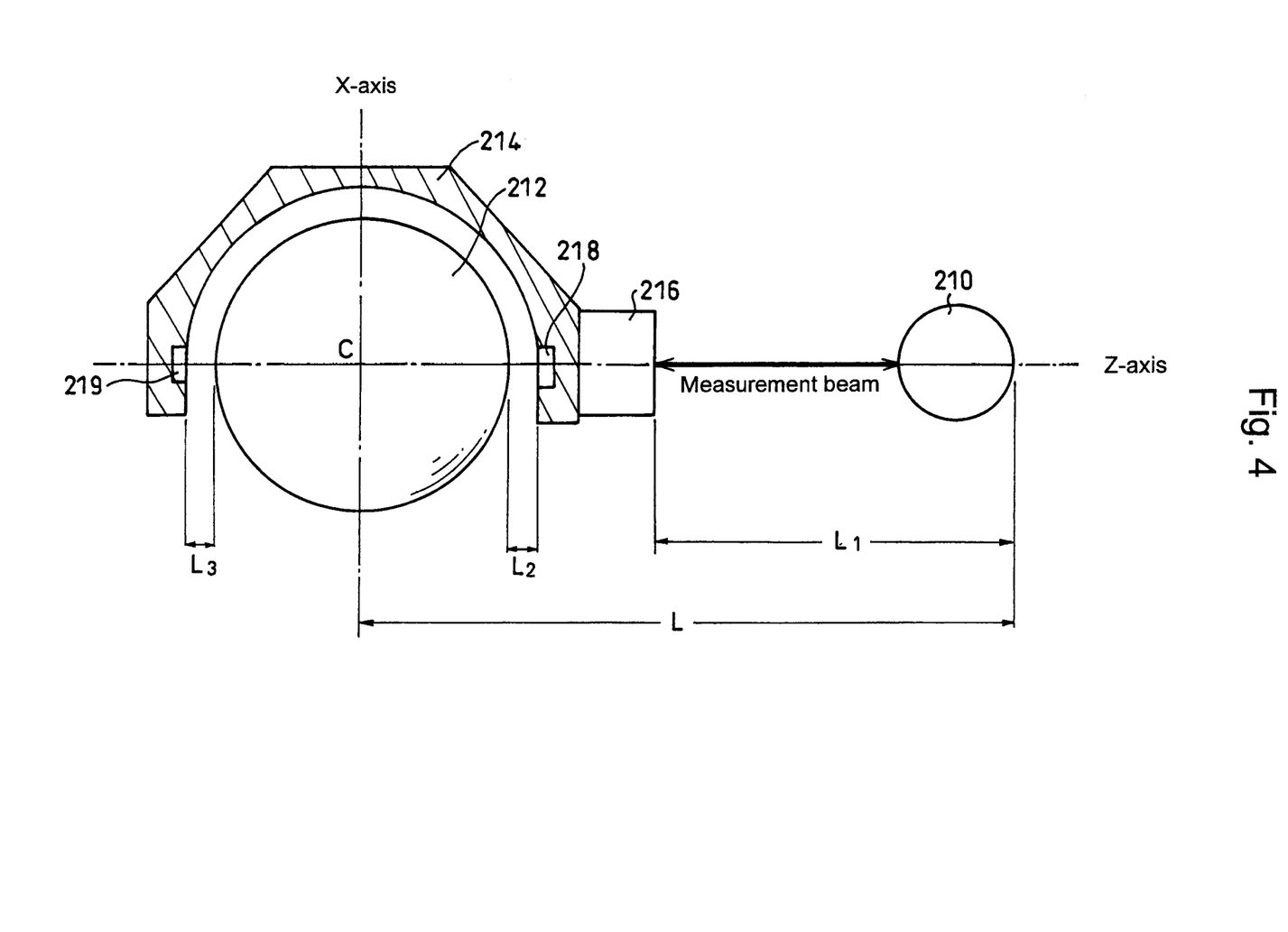
FIG. 4 is a cross-sectional view illustrating the main configuration of a laser tracking interferometer according to a first exemplary embodiment of the present invention.
Figure 5:
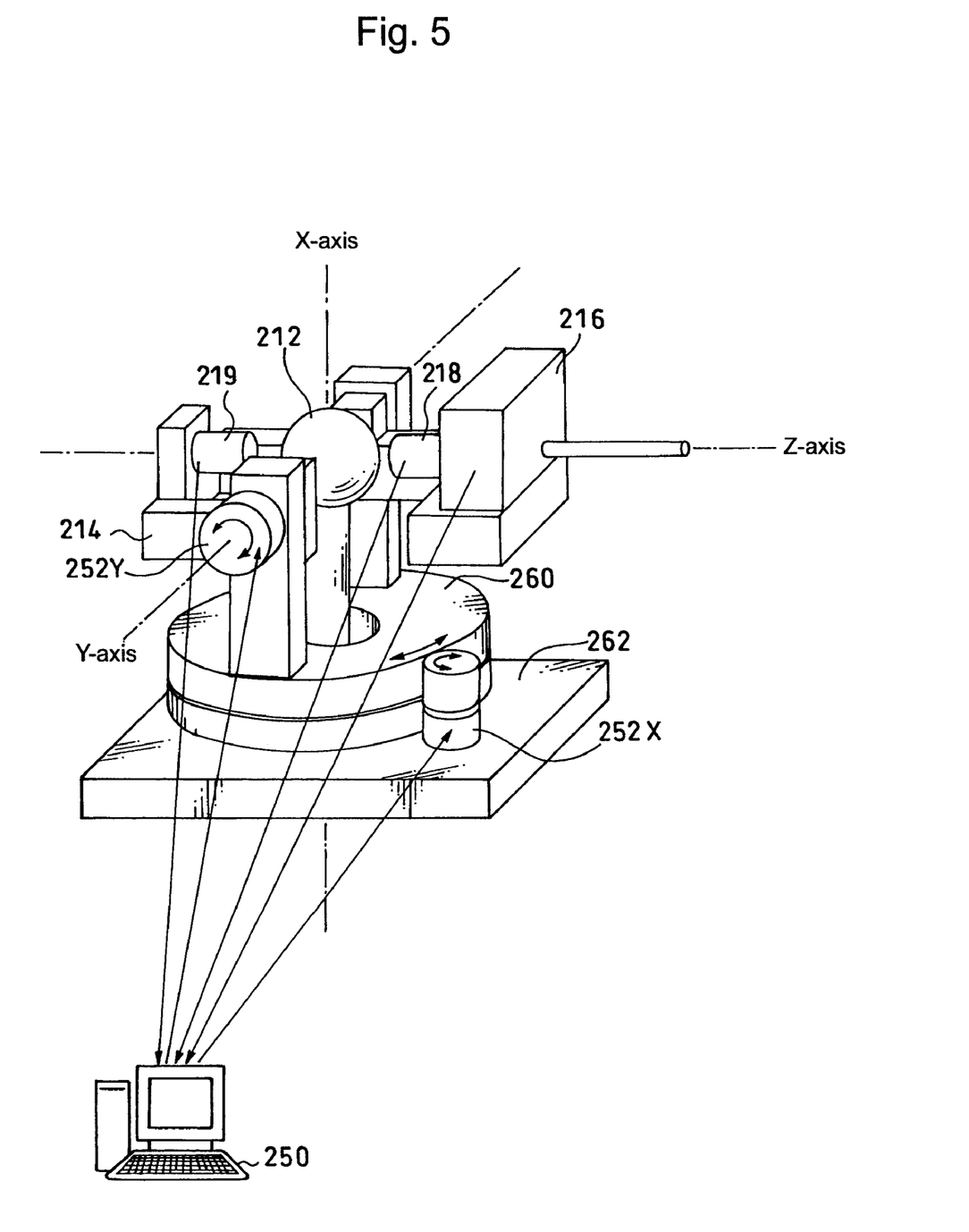
FIG. 5 is a perspective view illustrating the main configuration of the laser tracking interferometer of the first exemplary embodiment.
Figure 6:
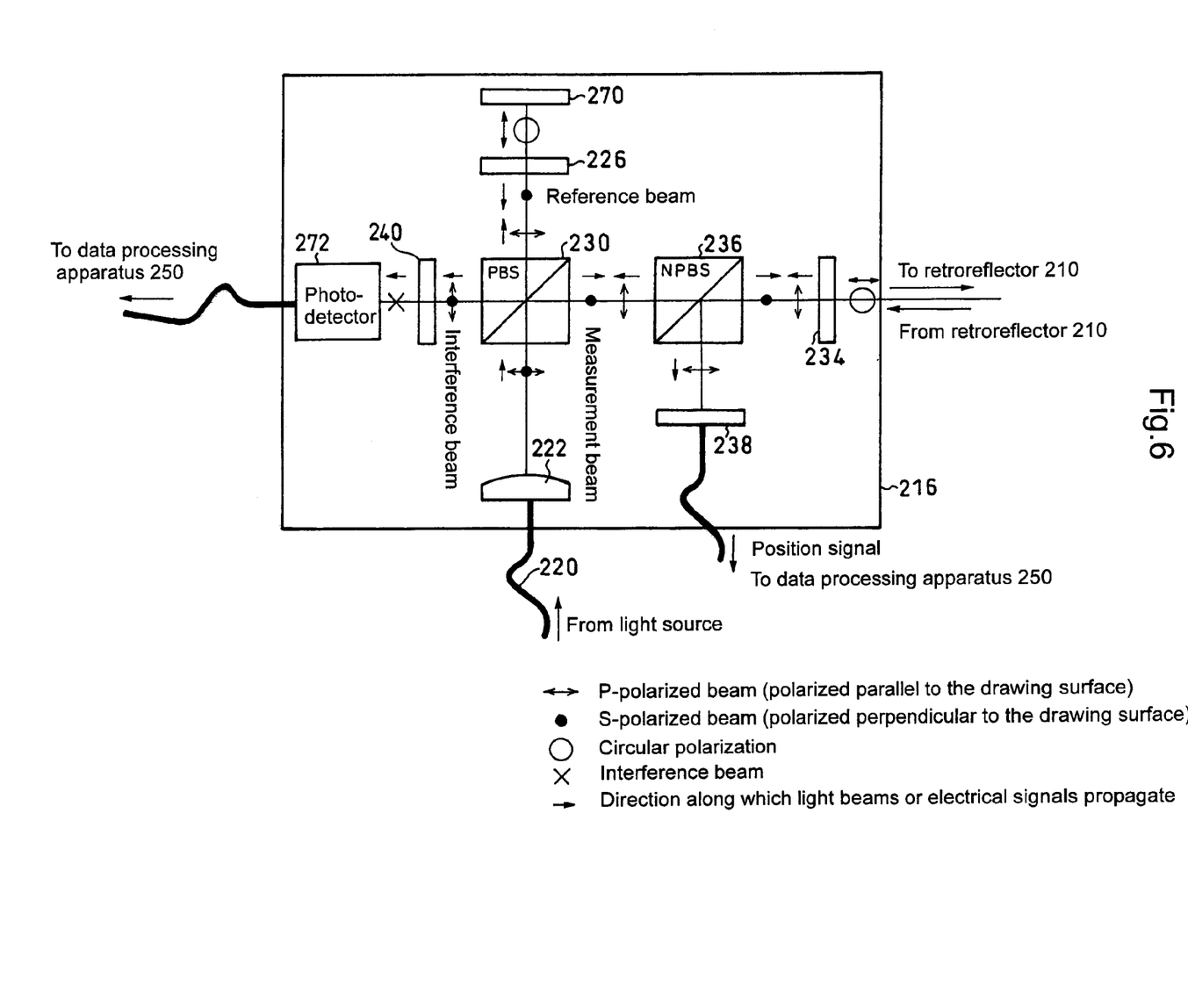
FIG. 6 is a view illustrating the optical path of an interferometer portion of the laser tracking interferometer of the first exemplary embodiment.

A first exemplary embodiment of the present invention is configured as shown in FIG. 4 (an overall view), FIG. 5 (a perspective view of a main portion), and FIG. 6 (an optical path of an interferometer portion). As illustrated, the first exemplary embodiment includes: a reference sphere 212 disposed at a fixed location; a carriage 214 designed to rotate about the center C of the reference sphere 212; a laser interferometer 216 for providing a displacement signal corresponding to a displacement of a retroreflector 210 serving as an object to be measured, and displacement gages 218 and 219 for providing a displacement signal corresponding to a relative displacement between the reference sphere 212 and the displacement gages, in which the laser interferometer 216 and the displacement gages 218 and 219 are disposed on the carriage 214, the displacement gages 218 and 219 being arranged coaxially with a laser beam on both sides of the reference sphere 212 to oppose to each other across the reference sphere 212; a data processing apparatus 250 (FIG. 5) for computing the displacement of the retroreflector 210 with respect to the reference sphere 212 from a displacement signal provided by the displacement gages 218 and 219 and the displacement signal provided by the laser interferometer 216; a QPD 238 (FIG. 6) serving as position sensitive detector for providing a position signal corresponding to the amount of deviation of a laser beam when the laser beam is reflected from the retroreflector 210 back into the laser interferometer 216 and moved in a direction orthogonal to the optical axis thereof; and an X-axis motor 252X and a Y-axis motor 252Y serving as control means for controlling the rotation of the carriage 214 based on the position signal from the position sensitive detector so that the amount of deviation becomes zero.

The displacement gages 218 and 219 can be, for example, a capacitive displacement gage or an eddy-current displacement gage. These displacement gages include a sensor having a larger effective area than the size of dust particles and flaws on a surface and a comparatively low lateral resolution, thus being less susceptible to flaws and dust particles on the surface of the reference sphere 212. Note that a fiber sensor or various types of contact displacement sensors can also be employed as the displacement gages 218 and 219.

The reference sphere 212 can be a metal sphere which is commercially available. This sphere is widely employed for industrial use, and extremely inexpensive when compared with a sphere that is formed of a material having a refractive index of 2.0 that is used for the one described in Patent Document 2. Note that the reference sphere 212 can be a sphere formed of ceramic, semiconductor, or glass, or one coated with metal, other than one formed of metal. However, to employ the eddy-current sensor as the displacement sensor, it is necessary to employ a sphere that is formed of metal or coated with metal.

The QPD 238 may be replaced by a two-dimensional PSD.

Referring to FIG. 5, included in this configuration are a support frame 260 for supporting the carriage 214 rotatably about the Y-axis; and a base 262 for supporting the support frame 260 rotatably about the X-axis. Referring to FIG. 6, also included are an optical fiber 220 for directing a light beam from a light source (not shown) into the laser interferometer 216; a collimator lens 222; a PBS 230; a λ/4 plate 226; an NPBS 236; a polarizing plate 240; a plane mirror 270 for reflecting a reference beam; and a photodetector 272 for detecting the intensity of an interference beam.

Now, a detailed description will be given to a method for measuring a displacement.

The amount of change in length (displacement) ΔL between the reference sphere 212, fixed and employed as a positional reference point, and the retroreflector 210 is determined by the following equation:

$$\Delta L = (\Delta L_2 - \Delta L_3)/2 + \Delta L_1 \ldots \quad (1)$$

Here, $\Delta L_1$ is a relative displacement measured using the laser interferometer 216 between the laser interferometer 216 and the retroreflector 210 (where a direction along which the distance increases is defined as positive (+)). On the other hand, $\Delta L_2$ is a relative displacement between the displacement gage 218, interposed between the laser interferometer 216 and the reference sphere 212, and the surface of the reference sphere 212 (where a direction along which the distance increases is defined as positive (+)). Further, $\Delta L_3$ is a relative displacement between the displacement gage 219 and the surface of the reference sphere 212 (where a direction along which the distance increases is defined as positive (+)).

The reference sphere 212 having a high sphericity allows the distances from the center C of the reference sphere 212 to the surface to be constant with high accuracy. This makes it possible to measure the displacement of the retroreflector 210 with high accuracy with respect to the center C of the reference sphere 212 even when the carriage 214 rotates about C.

As shown in FIG. 6, the $\Delta L_1$ can be measured by a method of measuring the retroreflector 210 as an object to be measured using a well-known Michelson interferometer.

That is, a light beam is allowed to enter the optical fiber 220 from a light source (not shown) and transmitted from the collimator lens 222. A portion of the beam is used as a reference beam and the remaining portion of the beam is used as a measurement beam.

The reference beam passes through the PBS 230 to be reflected off the plane mirror 270, and is then reflected off the PBS 230 to be directed to the photodetector 272.

On the other hand, the measurement beam first reflected off the PBS 230 is directed to the retroreflector 210. The measurement beam reflected off the retroreflector 210 enters back into the laser interferometer 216, and a portion thereof is reflected off the NPBS 236 to be incident upon the QPD 238. On the other hand, the measurement beam that has passed through the NPBS 236 interferes with the reference beam and is then incident upon the photodetector 272.

Since the output from the photodetector 272 varies according to intensity of the interference pattern of the incident interference beam, the output from the photodetector 272 can be used to measure the relative displacement $\Delta L_1$ between the laser interferometer 216 and the retroreflector 210.

On the other hand, the retroreflector 210 is automatically tracked in the same manner as disclosed in Patent Documents 1 and 2.

That is, a portion of the measurement beam incident upon the laser interferometer 216 enters the QPD 238. Thus, the position of the carriage 214 can be controlled by driving the motors 252X and 252Y to allow the position of the measurement beam on the QPD 238 to be constant all the time, thereby automatically tracking the retroreflector 210. This is possible because the position of the measurement beam incident upon the QPD 238 varies depending on the displacement of the retroreflector 210 in a direction normal to the optical axis of the measurement beam. That is, a displacement of the retroreflector 210 in a direction perpendicular to the optical axis of the measurement beam causes a parallel displacement of the optical axis of the measurement beam back reflected from the retroreflector 210. Accordingly, the retroreflector 210 can be automatically tracked by driving the X-axis motor 252X and the Y-axis motor 252Y so that a position signal delivered from the QPD 238 to the data processing apparatus 250 is kept constant all the time.

In this exemplary embodiment, the displacement gages 218 and 219 provided on both sides of the reference sphere 212 are intended to compensate for the temperature drift of the displacement gages 218 and 219. That is, when the displacement gages 218 and 219 have the same tendency of temperature drift, the displacement $\Delta L$ determined in the equation (1) is not susceptible to the temperature drift of the displacement gages. For example, suppose that an error $\Delta D$ caused by a temperature drift is added to the amount of change $\Delta L_2$ measured by the displacement gage 218, resulting in $\Delta L_2+\Delta D$. When the displacement gages 218 and 219 have the same tendency of temperature drift, the same error caused by the temperature drift is then added to the amount of displacement $\Delta L_3$ measured by the displacement gage 219, resulting in $\Delta L_3+\Delta D$. At this time, $\Delta L$ is given by the following equation, and is thus not susceptible to the temperature drift of the displacement gages.

$$\Delta L = \{\Delta L_2 + \Delta D - (\Delta L_3 + \Delta D)\}/2 + \Delta L_1 \qquad (2)$$
$$= (\Delta L_2 - \Delta L_3)/2 + \Delta L_1$$

Likewise, when the reference sphere 212 is subjected to isotropic thermal expansion, it is possible to compensate for the thermal expansion of the reference sphere 212.

Accordingly, when the displacement gages 218 and 219 are provided on both sides of the reference sphere 212, it is possible to construct a system that is robust to fluctuations in temperature.

Now, it will be shown below that an apparatus according to this exemplary embodiment is very robust to runout of a rotational mechanism.

Even when the entire carriage is displaced in the direction of the optical axis of the measurement beam of the laser interferometer 216 (in the direction of Z in FIGS. 4 and 5) while the carriage 214 rotates about the reference sphere 212, the computed $\Delta L$ is not susceptible to this displacement. That is, for example, suppose that the entire carriage is displaced by $\Delta D$ towards the retroreflector 210. In this case, $\Delta L_1$ becomes $\Delta L_1-\Delta D$, $\Delta L_2$ becomes $\Delta L_2+\Delta D$, and $\Delta L_3$ becomes $\Delta L_3-\Delta D$. Accordingly, $\Delta L$ is given by the following equation.

$$\Delta L = \{(\Delta L_2 + \Delta D) - (\Delta L_3 + \Delta D)\}/2 + (\Delta L_1 - \Delta D) \qquad (3)$$
$$= (\Delta L_2 - \Delta L_3)/2 + \Delta L_1$$

As such, even when the carriage 214 is displaced in the direction of the optical axis of the measurement beam, the computed $\Delta L$ is not susceptible to this displacement.

Now, it will be shown that even when the entire carriage is displaced (linearly) in a direction orthogonal to the optical axis of the measurement beam while the carriage 214 rotates about the reference sphere 212, the computed $\Delta L$ is not susceptible to this displacement. First, the $\Delta L_1$ is not susceptible to this displacement. Even when the laser interferometer 216 is displaced in a direction orthogonal to the optical axis of the measurement beam, the round-trip optical path length between the laser interferometer 216 and the retroreflector 210 will not vary, and thus the $\Delta L_1$ is not susceptible to this displacement. This is due to the property of the retroreflector 210. Then, when the displacement gage 218 is displaced in a direction orthogonal to the optical axis of the measurement beam and the value of $\Delta L_2$ is increased by $\Delta E$, the value of $\Delta L_3$ is also increased by $\Delta E$. At this time, $\Delta L$ is given by the following equation.

$$\Delta L = \{(\Delta L_2 + \Delta E) - (\Delta L_3 + \Delta E)\}/2 + \Delta L_1 \qquad (4)$$
$$= (\Delta L_2 - \Delta L_3)/2 + \Delta L_1$$

Accordingly, it is shown that even when the entire carriage is displaced in a direction orthogonal to the optical axis of the measurement beam, the computed $\Delta L$ is not susceptible to this displacement.

As described above, when the laser interferometer 216 is displaced in the direction of the optical axis of the measurement beam or in a direction orthogonal to the optical axis of the measurement beam, the $\Delta L$ is not susceptible to these displacements. Accordingly, an apparatus according to this exemplary embodiment is very robust to runout of a rotational mechanism.

Figure 7:
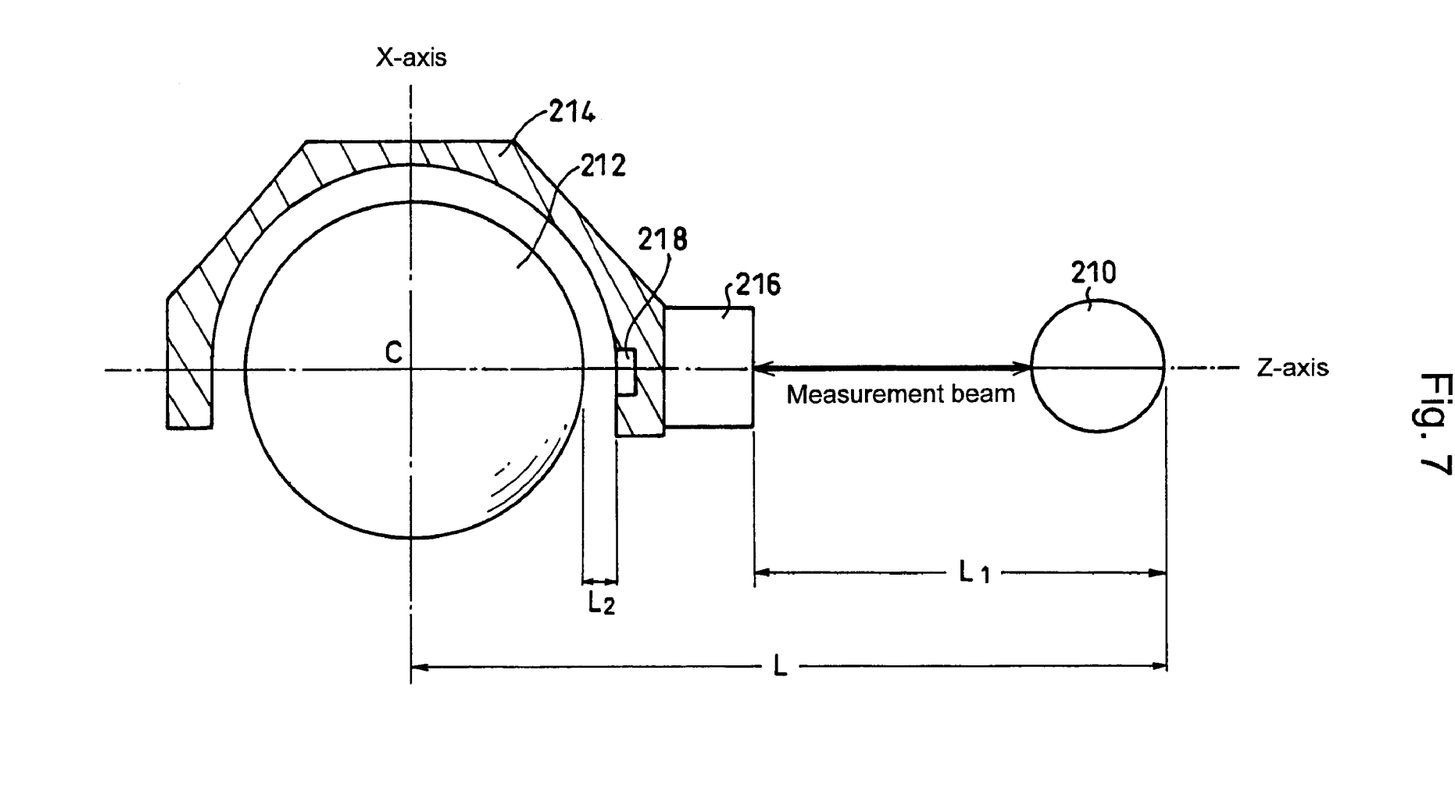
FIG. 7 is a cross-sectional view illustrating the main configuration of a laser tracking interferometer according to a second exemplary embodiment of the present invention.

Now, the main portion of a second exemplary embodiment of the present invention is shown in FIG. 7.

In the second exemplary embodiment, the displacement gage 218 is provided only on the side of the retroreflector 210 across the reference sphere 212 to measure ΔL. The displacement ΔL is computed using the following equation.

$$\Delta L = \Delta L_2 + \Delta L_1 \ldots \quad (5)$$

Here, the $\Delta L_2$ and $\Delta L_1$ are defined in the same manner as in the first exemplary embodiment.

This exemplary embodiment requires only one displacement gage, thereby allowing the apparatus to be manufactured at low costs.

Note that in this exemplary embodiment, an error produced in $\Delta L_2$ is directly added to the ΔL when the entire carriage is displaced (linearly) in a direction orthogonal to the optical axis of the measurement beam. However, when compared with the conventional technique disclosed in Patent Document 1 in which the center C of the reference sphere 12 is employed as a focus, this exemplary embodiment can provide an apparatus which is robust to runout of the rotational mechanism because the S/N of the displacement signal provided by the laser interferometer will not be too degraded to accomplish measurement.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

What is claimed is:

1. A laser tracking interferometer which directs a laser beam to a retroreflector serving as an object to be measured to sense a displacement of the retroreflector using interference with a laser beam back reflected from the retroreflector and to track the retroreflector using a change in position of the optical axis of the laser beam, the laser tracking interferometer comprising:

a reference sphere disposed at a fixed location;

a carriage configured to rotate about a center of the reference sphere;

a laser interferometer for providing a displacement signal corresponding to a displacement of the retroreflector, and a displacement gage for providing a displacement signal corresponding to a relative displacement between the reference sphere and the displacement gage, the laser interferometer and the displacement gage being disposed on the carriage;

a data processing apparatus for computing a displacement of the retroreflector with respect to the reference sphere in accordance with the displacement signal provided by the displacement gage and the displacement signal provided by the laser interferometer;

position sensitive detector for providing a position signal corresponding to the amount of deviation of a laser beam when the laser beam is reflected off the retroreflector back into the laser interferometer and deviated in a direction orthogonal to its optical axis; and control means for controlling rotation of the carriage based on the position signal from the position sensitive detector so that the amount of deviation becomes zero.

2. The laser tracking interferometer according to claim 1, wherein the laser interferometer is a Michelson interferometer.

3. The laser tracking interferometer according to claim 1, wherein the displacement gage is provided on both sides of the reference sphere.

4. The laser tracking interferometer according to claim 1, wherein the displacement gage is a capacitive displacement gage or an eddy-current displacement gage.

5. The laser tracking interferometer according to claim 1, wherein the reference sphere is a metal sphere.

6. The laser tracking interferometer according to claim 1, wherein the position sensitive detector is a quadrant photodiode or two-dimensional PSD.

7. The laser tracking interferometer according to claim 3, wherein the displacement gage is a capacitive displacement gage or an eddy-current displacement gage.

8. The laser tracking interferometer according to claim 3, wherein the reference sphere is a metal sphere.

9. The laser tracking interferometer according to claim 3, wherein the position sensitive detector is a quadrant photodiode or two-dimensional PSD.

* * * * *

UNITED STATES PATENT AND TRADEMARK OFFICE
CERTIFICATE OF CORRECTION

PATENT NO.        : 7,388,674 B2
APPLICATION NO. : 11/458533
DATED             : June 17, 2008
INVENTOR(S)       : Yanaka et al.

It is certified that error appears in the above-identified patent and that said Letters Patent is hereby corrected as shown below:

In the drawings replace sheet 2 of 7, figure 2 with the attached.

Signed and Sealed this

Sixteenth Day of September, 2008

JON W. DUDAS
*Director of the United States Patent and Trademark Office*

Fig. 2